(12) United States Patent
Nolin

(10) Patent No.: US 11,388,883 B2
(45) Date of Patent: Jul. 19, 2022

(54) LITTER BOX TOOL STORAGE ASSEMBLY

(71) Applicant: Kimberly Nolin, Evans, GA (US)

(72) Inventor: Kimberly Nolin, Evans, GA (US)

( * ) Notice: Subject to any disclaimer, the term of this patent is extended or adjusted under 35 U.S.C. 154(b) by 512 days.

(21) Appl. No.: 16/541,824

(22) Filed: Aug. 15, 2019

(65) Prior Publication Data
US 2021/0045346 A1    Feb. 18, 2021

(51) Int. Cl.
A01K 1/01 (2006.01)
B65D 43/16 (2006.01)
B65D 25/20 (2006.01)

(52) U.S. Cl.
CPC ............... A01K 1/01 (2013.01); B65D 25/20 (2013.01); B65D 43/16 (2013.01)

(58) Field of Classification Search
CPC ........ A01K 1/01; A01K 1/011; A01K 1/0125; E01H 2001/128; E01H 2001/1286; B65F 1/0033; B65F 1/004; B65F 1/0053; B65F 2220/101; B65F 1/06; B65F 1/062; B65F 1/065; B65F 1/067; B65F 1/068; B65D 25/20; B65D 43/16; B65D 25/00; B65D 25/005; B65D 25/02; B65D 25/04; B65D 25/16; B65D 25/38; B65D 25/52
See application file for complete search history.

(56) References Cited

U.S. PATENT DOCUMENTS

| 5,134,974 | A | 8/1992 | Houser |
| 6,338,318 | B1 | 1/2002 | Apichom |
| 6,705,468 | B1 | 3/2004 | Hall |
| 2006/0196438 | A1 | 9/2006 | Caputa |
| 2013/0277366 | A1 | 10/2013 | Paculdo |

Primary Examiner — Don M Anderson

(57) ABSTRACT

A litter box tool storage assembly for storing tools for litter box maintenance includes a box that has a plurality of garbage bags stored therein for storing, and subsequently discarding, soiled kitty litter. A first storage unit is coupled to and extends away from the box. The first storage unit stores a scoop for scooping the soiled kitty litter. A second storage unit is coupled to and extends away from the box. The second storage unit contains maintenance items for kitty litter. The second storage unit is positioned on an opposite side of the box from the first storage unit.

9 Claims, 5 Drawing Sheets

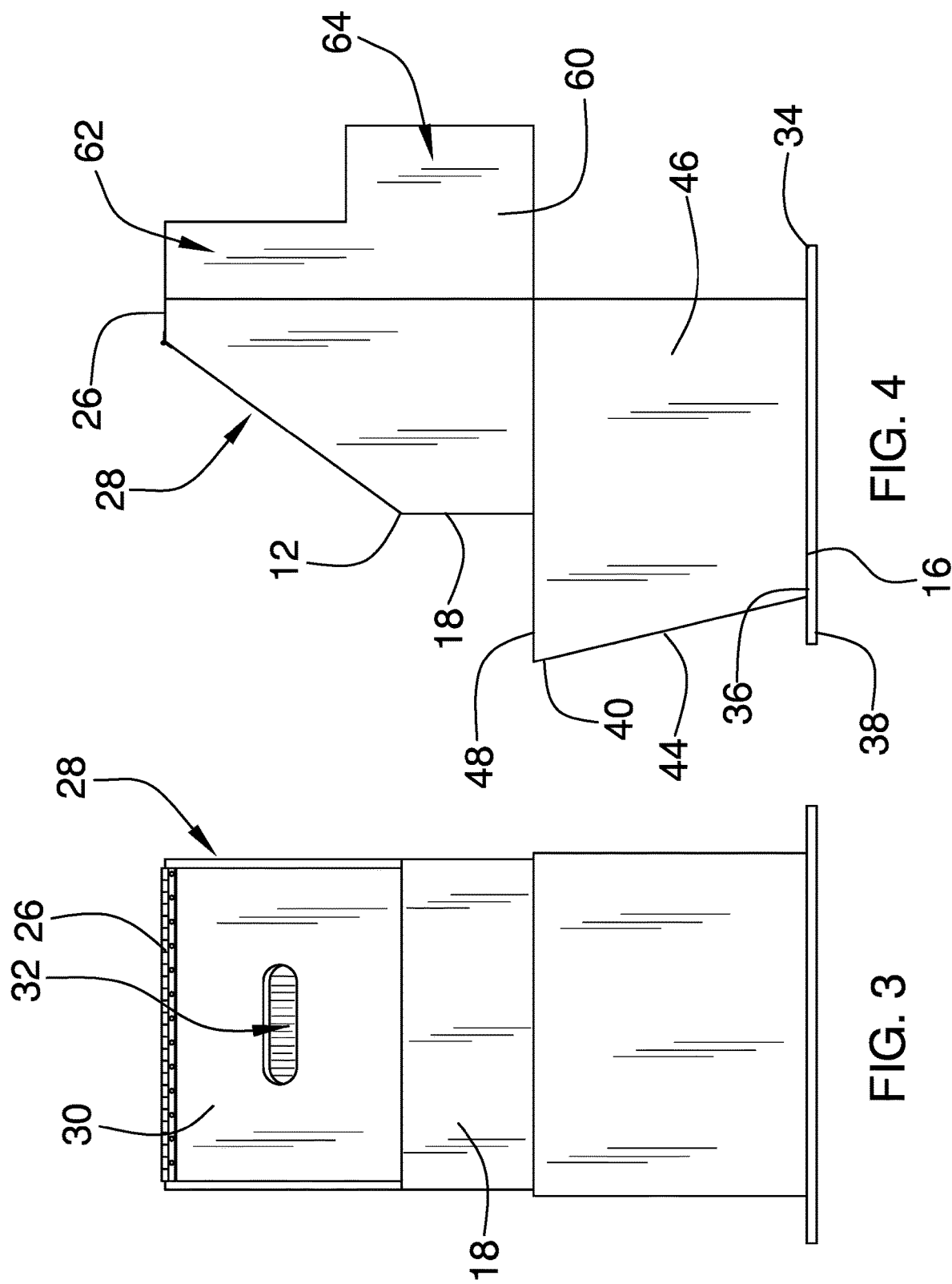

LITTER BOX TOOL STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to tool storage devices and more particularly pertains to a new tool storage device for storing tools for litter box maintenance.

BRIEF SUMMARY OF THE INVENTION

An embodiment of the disclosure meets the needs presented above by generally comprising a box that has a plurality of garbage bags stored therein for storing, and subsequently discarding, soiled kitty litter. A first storage unit is coupled to and extends away from the box. The first storage unit stores a scoop for scooping the soiled kitty litter. A second storage unit is coupled to and extends away from the box. The second storage unit contains maintenance items for kitty litter. The second storage unit is positioned on an opposite side of the box from the first storage unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a left side view of an embodiment of the disclosure.

DETAILED DESCRIPTION OF THE INVENTION

Figure 1:
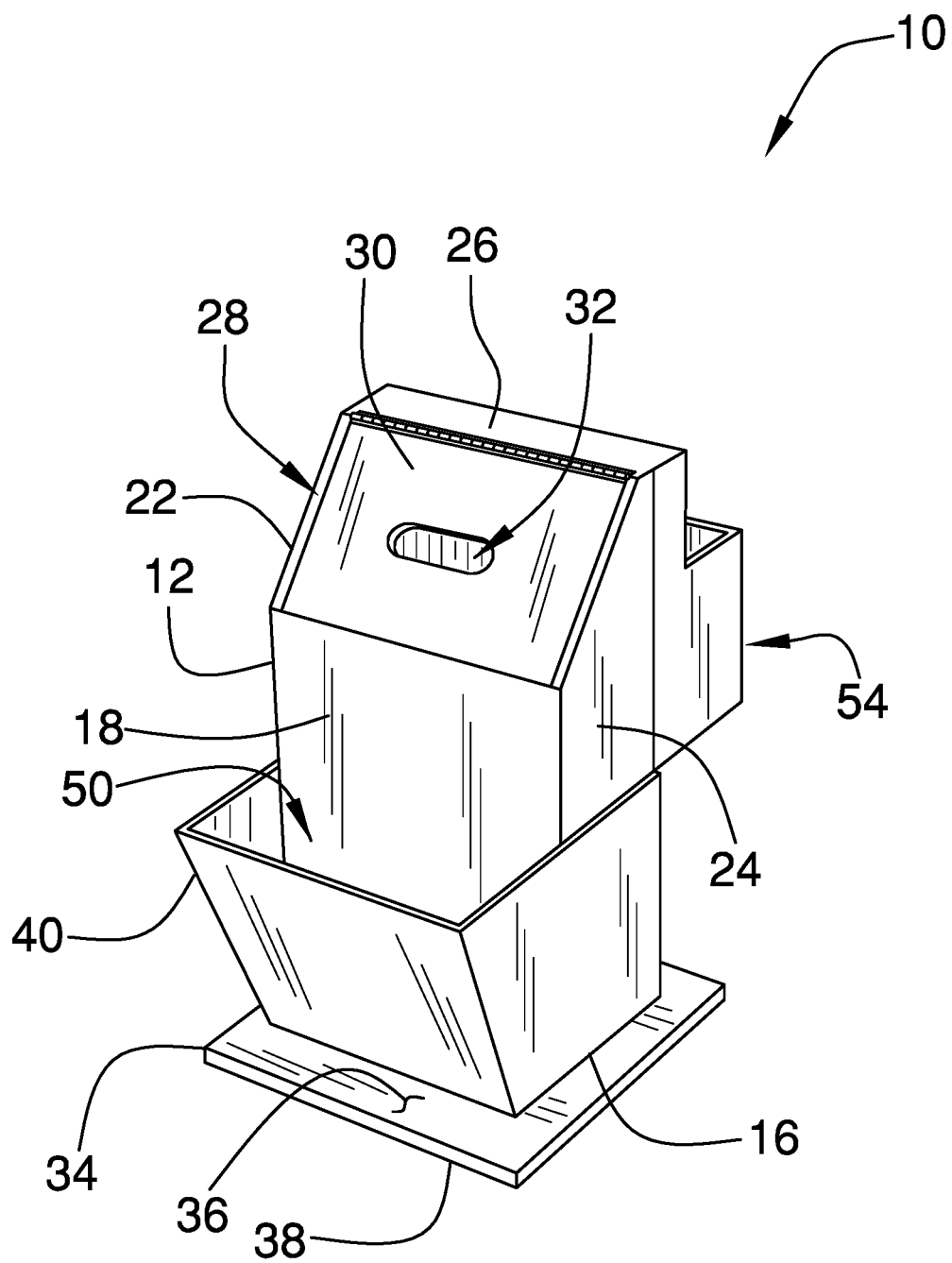
FIG. 1 is a front perspective view of a litter box tool storage assembly according to an embodiment of the disclosure.
Figure 2:
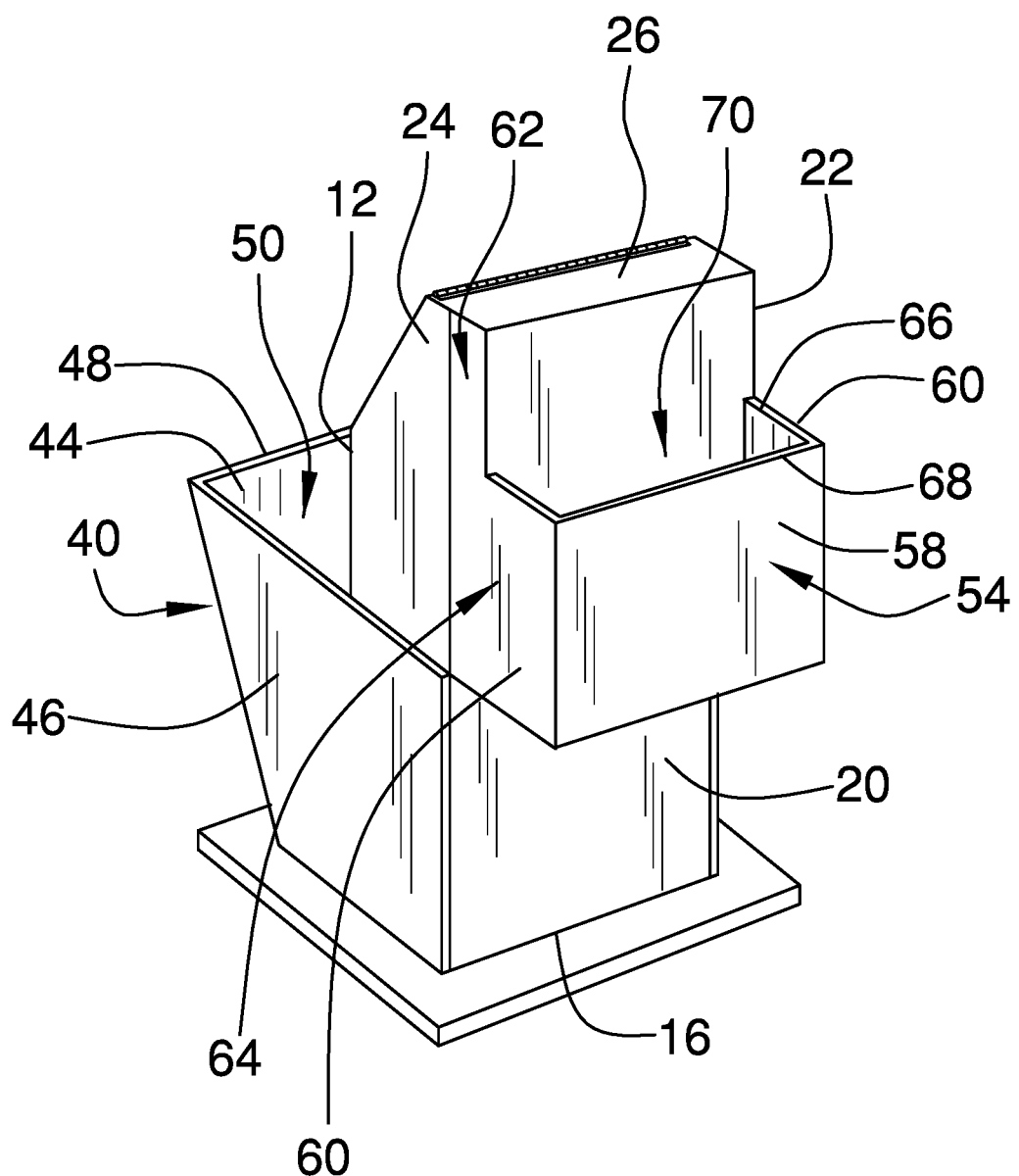
FIG. 2 is a back perspective view of an embodiment of the disclosure.
Figure 6:
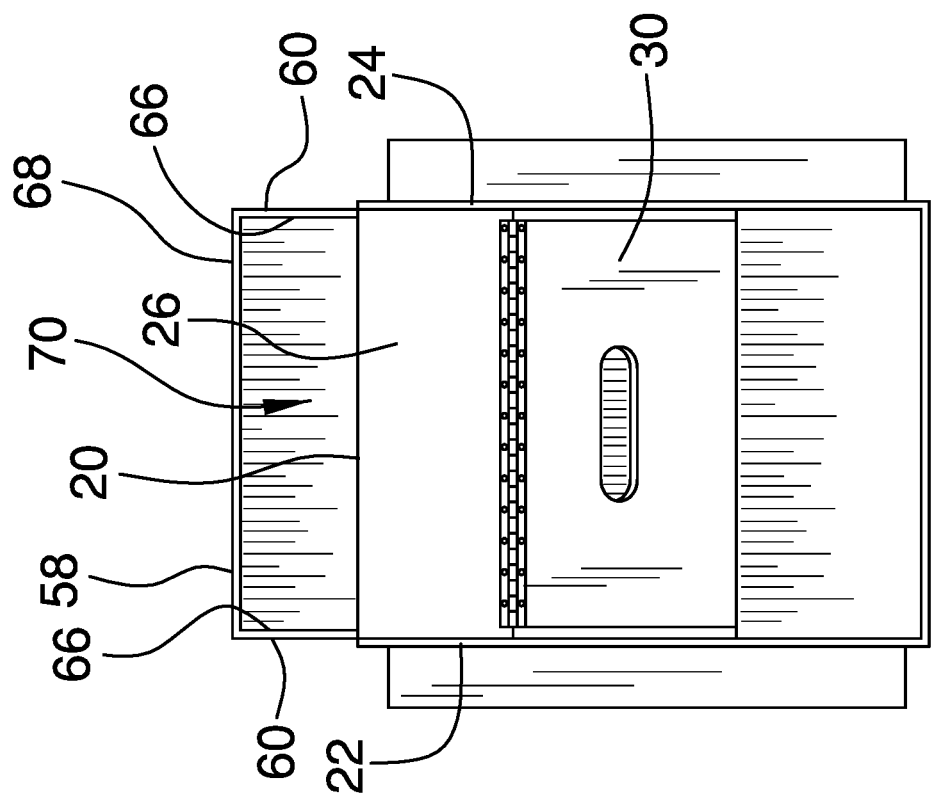
FIG. 6 is a top view of an embodiment of the disclosure.
Figure 5:
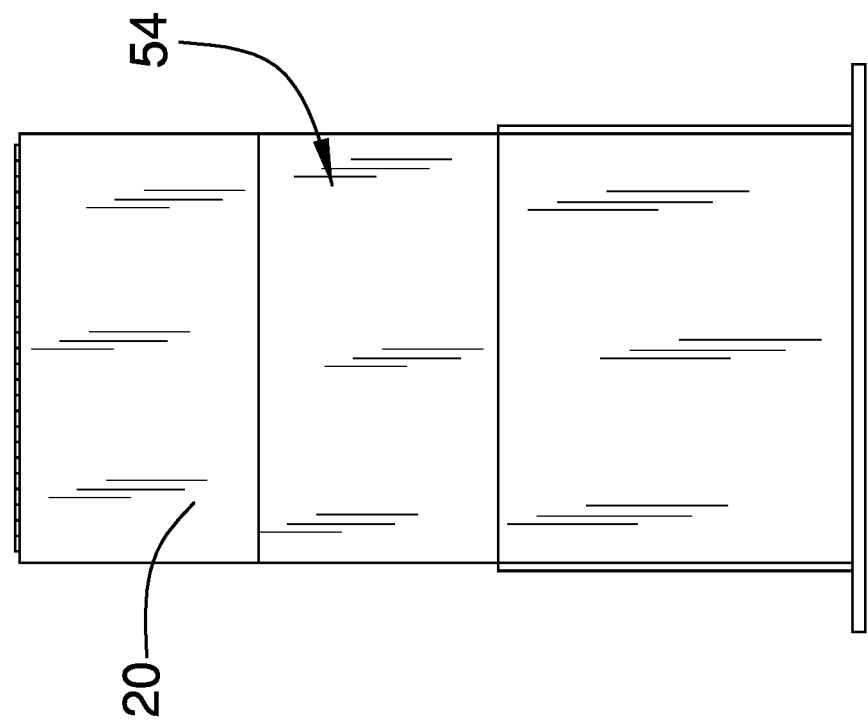
FIG. 5 is a back view of an embodiment of the disclosure.
Figure 7:
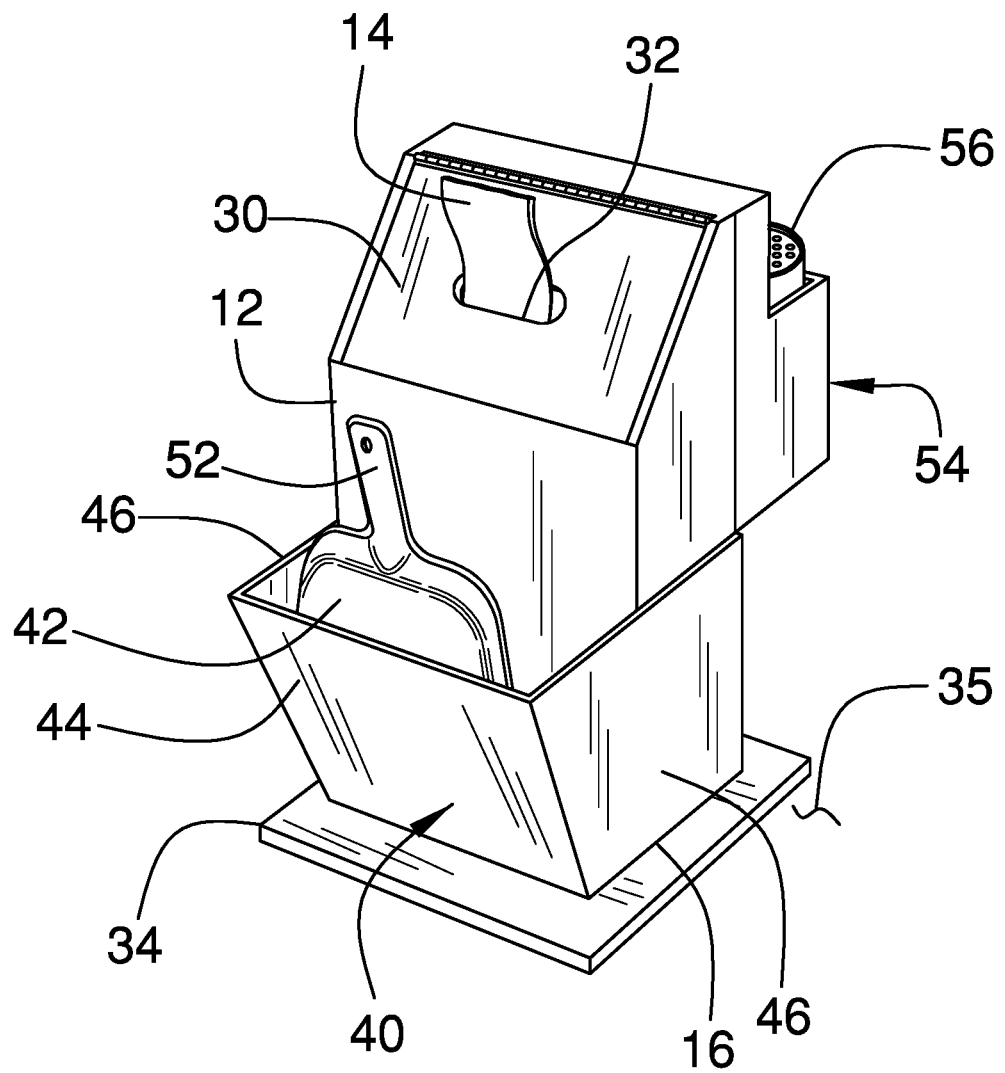
FIG. 7 is a perspective in-use view of an embodiment of the disclosure.

With reference now to the drawings, and in particular to FIGS. 1 through 7 thereof, a new tool storage device embodying the principles and concepts of an embodiment of the disclosure and generally designated by the reference numeral 10 will be described.

As best illustrated in FIGS. 1 through 7, the litter box tool storage assembly 10 generally comprises a box 12 that has a plurality of garbage bags 14 stored therein. Each of the garbage bags 14 is removable from the box 12 for containing kitty litter that is soiled with feline feces and feline urine. In this way each of the garbage bags 14 facilitates the soiled kitty litter to be disposed of in a garbage container or the like. The box 12 has a bottom wall 16, a front wall 18, a back wall 20, a first lateral wall 22, a second lateral wall 24 and a top wall 26. The top wall 26 has an angled portion 28 that slopes downwardly toward the front wall 18. Additionally, the angled portion 28 of the top wall 26 is open to access an interior of the box 12.

A lid 30 is hingedly coupled to the box 12. The lid 30 has an opening 32 extending therethrough and each of the garbage bags 14 is removable through the opening 32. The lid 30 is positioned on the angled portion 28 of the top wall 26 of the box 12. Additionally, the opening 32 is centrally positioned on the lid 30.

A base 34 is coupled to the box 12 having the box 12 extending upwardly from the box 12. The base 34 supports the box 12 in a vertical orientation on a support surface 35, such as a floor of a house or the like. The base 34 has a top surface 36 and a bottom surface 38, and the bottom wall 16 of the box 12 is coupled to the top surface 36 of the base 34. The bottom surface 38 of the base 34 abuts the support surface 35.

A first storage unit 40 is coupled to and extends away from the box 12 to store a scoop 42 for scooping the soiled kitty litter. The first storage unit 40 has a forward wall 44 and a pair of lateral walls 46. Each of the lateral walls 46 and the forward wall 44 extend upwardly from the top surface 36 of the base 34. Moreover, the forward wall 44 is spaced from the front wall 18 of the box 12 and each of the lateral walls 46 extends forwardly from a respective one of the first lateral wall 22 and the second lateral wall 24 of the box 12. Each of the forward wall 44 and the lateral walls 46 has a distal edge 48 with respect to the base 34 defining an opening 50 into the first storage unit 40 for receiving the scoop 42.

The forward wall 44 slopes inwardly toward a center of the box 12 between the distal edge 48 of the forward wall 44 and the top surface 36 of the base 34. In this way the forward wall 44 directs a handle 52 of the scoop 42 away from the box 12 thereby enhancing gripping the handle 52 for removing the scoop 42. The first storage unit 40 has a width between each of the lateral walls 46 that is greater than a width between the first lateral wall 22 and the second lateral wall 24 of the box 12.

A second storage unit 54 is coupled to and extends away from the box 12 to contain maintenance items 56 for kitty litter. The maintenance items 56 may be powdered deodorant, chemical cleaners or any other substances employed for litter box treatment and maintenance. The second storage unit 54 is positioned on an opposite side of the box 12 from the first storage unit 40. The second storage unit 54 has a rear wall 58 and a pair of sidelong walls 60, and each of the sidelong walls 60 extends rearwardly from a respective one of the first lateral wall 22 and the second lateral wall 24 of the box 12.

The rear wall 58 is spaced from the back wall 20 of the box 12 and each of the sidelong walls 60 extends from the top wall 26 of the box 12 toward the bottom wall 16 of the box 12. Each of the sidelong walls 60 has an upper portion 62 and a lower portion 64. The lower portion 64 extends further from the back wall 20 of the box 12 than the upper portion 62. The lower portion 64 has a top edge 66 and the rear wall 58 has an upper edge 68. The upper edge 68 is aligned with the top edge 66 to define an opening 70 into the second storage unit 54.

In use, the garbage bags 14 are positioned in the box 12 and the garbage bags 14 are individually removed through the opening 32 in the lid 30. The scoop 42 is removed from the first storage unit 40 and the soiled kitty litter is scooped into the garbage bag 14. In this way the soiled kitty litter can be disposed of in a garbage receptacle or the like. The scoop 42 is replaced in the first storage unit 40 and the maintenance items 56 are employed for treating and maintaining the litter box. The box 12, the first storage unit 40 and the second storage unit 54 facilitate all of the tools for maintaining a litter box to be stored in a single location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A litter box tool storage assembly being configured to store tools and objects related to the care of a domesticated feline, said assembly comprising:
   a box having a plurality of garbage bags being stored therein, each of said garbage bags being removable from said box for containing kitty litter being soiled with feline feces and feline urine wherein each of said garbage bags is configured to facilitate the soiled kitty litter to be disposed;
   a lid being hingedly coupled to said box, said lid having an opening extending therethrough, each of said garbage bags being removable through said opening;
   a base being coupled to said box having said box extending upwardly from said base wherein said base is configured to support said box in a vertical orientation on a support surface;
   a first storage unit being coupled to and extending away from said box wherein said first storage unit is configured to store a scoop for scooping the soiled kitty litter; and
   a second storage unit being coupled to and extending away from said box wherein said second storage unit is configured to contain maintenance items for kitty litter, said second storage unit being positioned on an opposite side of said box from said first storage unit.

2. The assembly according to claim 1, wherein:
   said box has a bottom wall, a front wall, a back wall, a first lateral wall, a second lateral wall and a top wall, said top wall having an angled portion sloping downwardly toward said front wall, said angled portion of said top wall being open to access an interior of said box; and
   said lid is positioned on said angled portion of said top wall of said box, said opening being centrally positioned on said lid.

3. The assembly according to claim 2, wherein said base has a top surface and a bottom surface, said bottom wall of said box being coupled to said top surface of said base, said bottom surface of said base abutting the support surface.

4. The assembly according to claim 3, wherein said first storage unit has a forward wall and a pair of lateral walls, each of said lateral walls and said forward wall extending upwardly from said top surface of said base, said forward wall being spaced from said front wall of said box, each of said lateral walls extending forwardly from a respective one of said first lateral wall and said second lateral wall of said box, each of said forward wall and said lateral walls having a distal edge with respect to said base defining an opening into said first storage unit for receiving the scoop.

5. The assembly according to claim 4, wherein said forward wall angles inwardly toward a center of said box between said distal edge of said forward wall and said top surface of said base wherein said forward wall is configured to direct a handle of the scoop away from said box thereby enhancing gripping the handle for removing the scoop.

6. The assembly according to claim 5, wherein said first storage unit has a width between each of said lateral walls being greater than a width between said first lateral wall and said second lateral wall of said box.

7. The assembly according to claim 3, wherein said second storage unit has a rear wall and a pair of sidelong walls, each of said sidelong walls extending rearwardly from a respective one of said first lateral wall and said second lateral wall of said box, said rear wall being spaced from said back wall of said box, each of said sidelong walls extending from said top wall of said box toward said bottom wall of said box.

8. The assembly according to claim 7, wherein each of said sidelong walls has an upper portion and a lower portion, said lower portion extending further from said back wall of said box than said upper portion, said lower portion having a top edge, said rear wall having an upper edge, said upper edge being aligned with said top edge to define an opening into said second storage unit.

9. A litter box tool storage assembly being configured to store tools and objects related to the care of a domesticated feline, said assembly comprising:
- a box having a plurality of garbage bags being stored therein, each of said garbage bags being removable from said box for containing kitty litter being soiled with feline feces and feline urine wherein each of said garbage bags is configured to facilitate the soiled kitty litter to be disposed, said box having a bottom wall, a front wall, a back wall, a first lateral wall, a second lateral wall and a top wall, said top wall having an angled portion sloping downwardly toward said front wall, said angled portion of said top wall being open to access an interior of said box;
- a lid being hingedly coupled to said box, said lid having an opening extending therethrough, each of said garbage bags being removable through said opening, said lid being positioned on said angled portion of said top wall of said box, said opening being centrally positioned on said lid;
- a base being coupled to said box having said box extending upwardly from said base wherein said base is configured to support said box in a vertical orientation on a support surface; said base having a top surface and a bottom surface, said bottom wall of said box being coupled to said top surface of said base, said bottom surface of said base abutting the support surface;
- a first storage unit being coupled to and extending away from said box wherein said first storage unit is configured to store a scoop for scooping the soiled kitty litter, said first storage unit having a forward wall and a pair of lateral walls, each of said lateral walls and said forward wall extending upwardly from said top surface of said base, said forward wall being spaced from said front wall of said box, each of said lateral walls extending forwardly from a respective one of said first lateral wall and said second lateral wall of said box, each of said forward wall and said lateral walls having a distal edge with respect to said base defining an opening into said first storage unit for receiving the scoop, said forward wall angling inwardly toward a center of said box between said distal edge of said forward wall and said top surface of said base wherein said forward wall is configured to direct a handle of the scoop away from said box thereby enhancing gripping the handle for removing the scoop, said first storage unit having a width between each of said lateral walls being greater than a width between said first lateral wall and said second lateral wall of said box; and
- a second storage unit being coupled to and extending away from said box wherein said second storage unit is configured to contain maintenance items for kitty litter, said second storage unit being positioned on an opposite side of said box from said first storage unit, said second storage unit having a rear wall and a pair of sidelong walls, each of said sidelong walls extending rearwardly from a respective one of said first lateral wall and said second lateral wall of said box, said rear wall being spaced from said back wall of said box, each of said sidelong walls extending from said top wall of said box toward said bottom wall of said box, each of said sidelong walls having an upper portion and a lower portion, said lower portion extending further from said back wall of said box than said upper portion, said lower portion having a top edge, said rear wall having an upper edge, said upper edge being aligned with said top edge to define an opening into said second storage unit.

* * * * *